(12) United States Patent
Feinbloom et al.

(10) Patent No.: US 9,400,366 B2
(45) Date of Patent: *Jul. 26, 2016

(54) ADJUSTABLE OPTICAL AXIS CONTROL

(71) Applicant: Designs for Vision, Inc., Ronkonkomo, NY (US)

(72) Inventors: Richard E. Feinbloom, New York, NY (US); Kenneth Braganca, Sayville, NY (US); Roma Montifar, Elmhurst, NY (US)

(73) Assignee: Designs for Vision, Inc., Ronokonkoma, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/063,279

(22) Filed: Mar. 7, 2016

(65) Prior Publication Data
US 2016/0187610 A1     Jun. 30, 2016

Related U.S. Application Data

(63) Continuation of application No. 14/599,487, filed on Jan. 17, 2015, now Pat. No. 9,280,033.

(60) Provisional application No. 62/028,692, filed on Jul. 24, 2014.

(51) Int. Cl.
| G03B 11/00 | (2006.01) |
| G02B 7/00 | (2006.01) |
| G02B 7/18 | (2006.01) |
| G02C 7/08 | (2006.01) |
| H04N 5/225 | (2006.01) |
| H04N 5/232 | (2006.01) |

(52) U.S. Cl.
CPC .............. *G02B 7/003* (2013.01); *G02B 7/1805* (2013.01); *G02C 7/08* (2013.01); *H04N 5/2253* (2013.01); *H04N 5/2254* (2013.01); *H04N 5/23238* (2013.01)

(58) Field of Classification Search
USPC ......................................................... 396/544
See application file for complete search history.

(56) References Cited

U.S. PATENT DOCUMENTS

| 2013/0003173 A1 | 1/2013 | Kim |
| 2014/0267640 A1 | 9/2014 | Barziza |
| 2015/0281530 A1 | 10/2015 | Kessler |

OTHER PUBLICATIONS

Bausch &Lomb, Job coach for Prescription Laboratory Operations, 1946, pp. 59064.

*Primary Examiner* — David Gray
*Assistant Examiner* — Dennis Hancock
(74) *Attorney, Agent, or Firm* — Law Office of Carl Giordano, PC

(57) ABSTRACT

A device for aligning the optical axis of a camera is disclosed. The optical alignment device comprises a bracket attaching the device to a frame, the frame incorporating a camera system therein, the camera system having an optical axis projecting substantially horizontally from the camera system, a housing comprising a first part fixed to a first side of the bracket; and a second part comprising a prism refracting the optical axis of the camera system based on a power of the prism and a rotation of the prism with respect to the optical axis and a hinge between the first part and the second part, the hinge rotating the second part with respect to the first part.

9 Claims, 16 Drawing Sheets

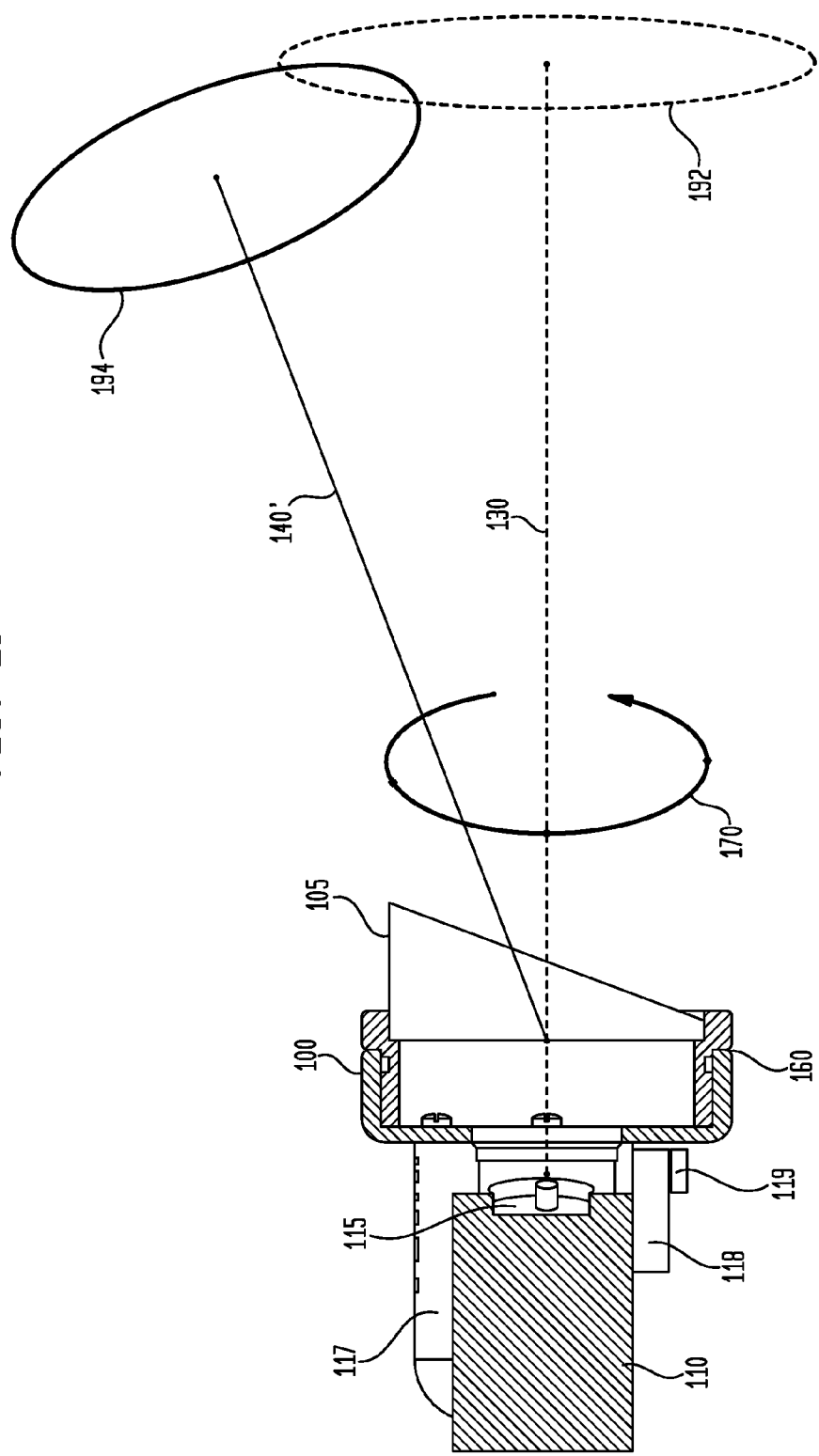

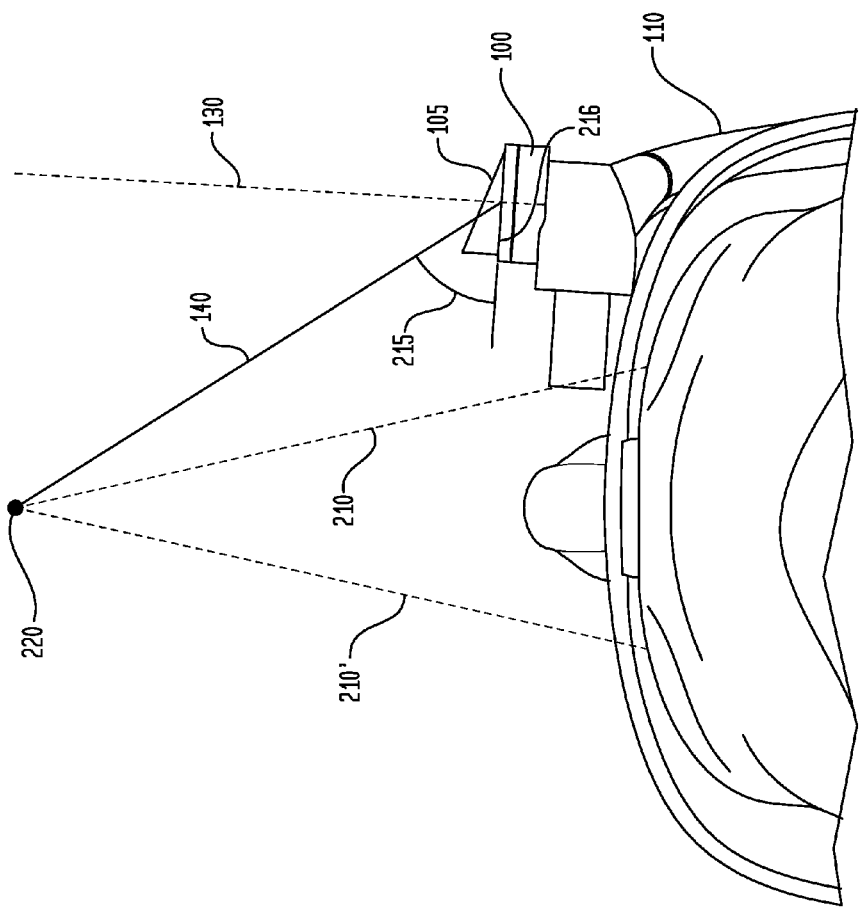

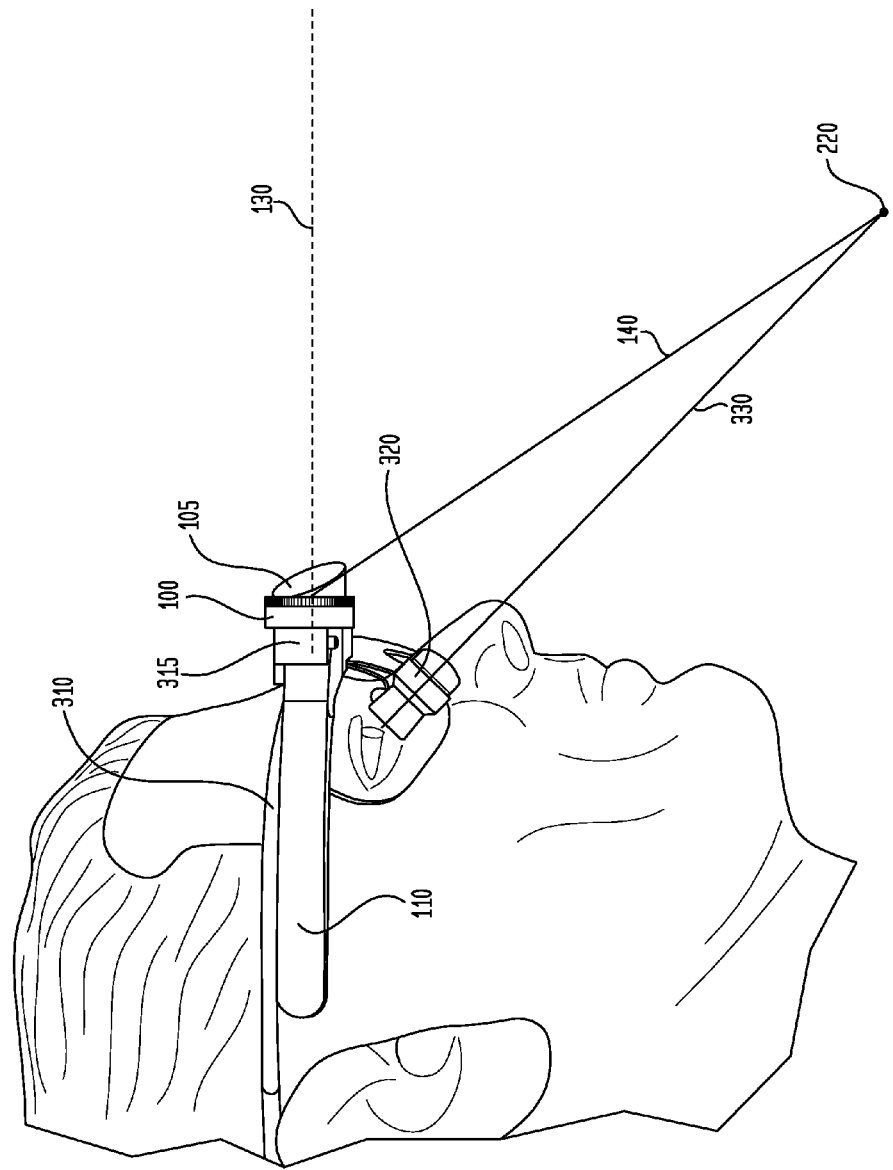

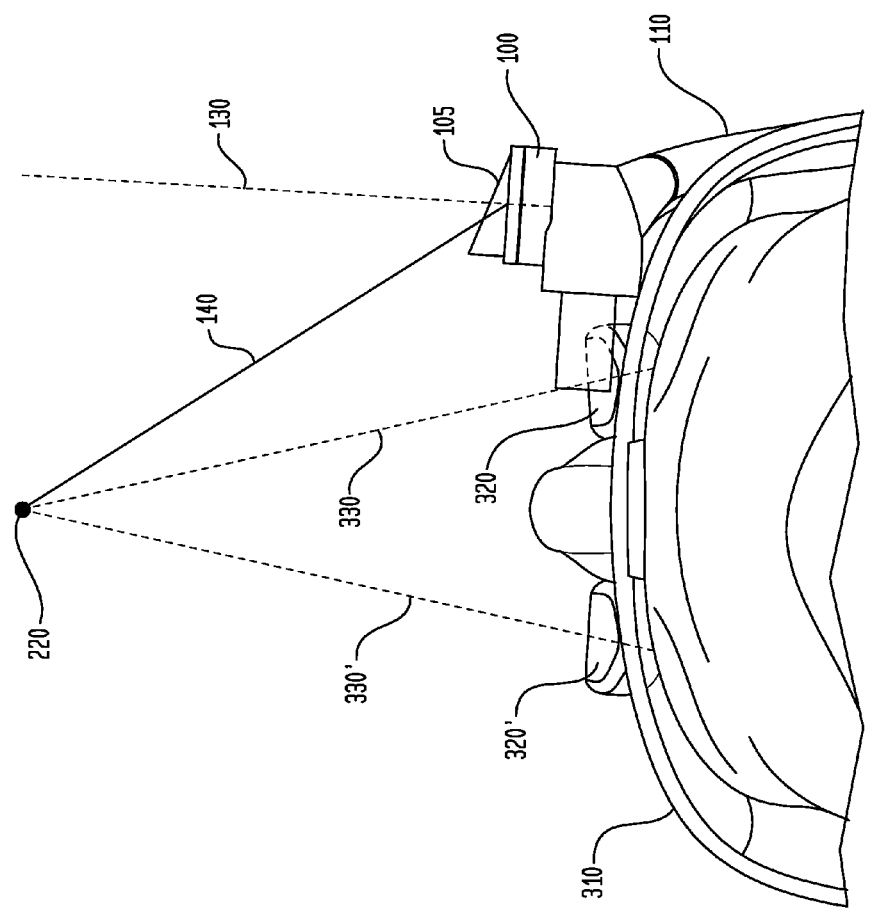

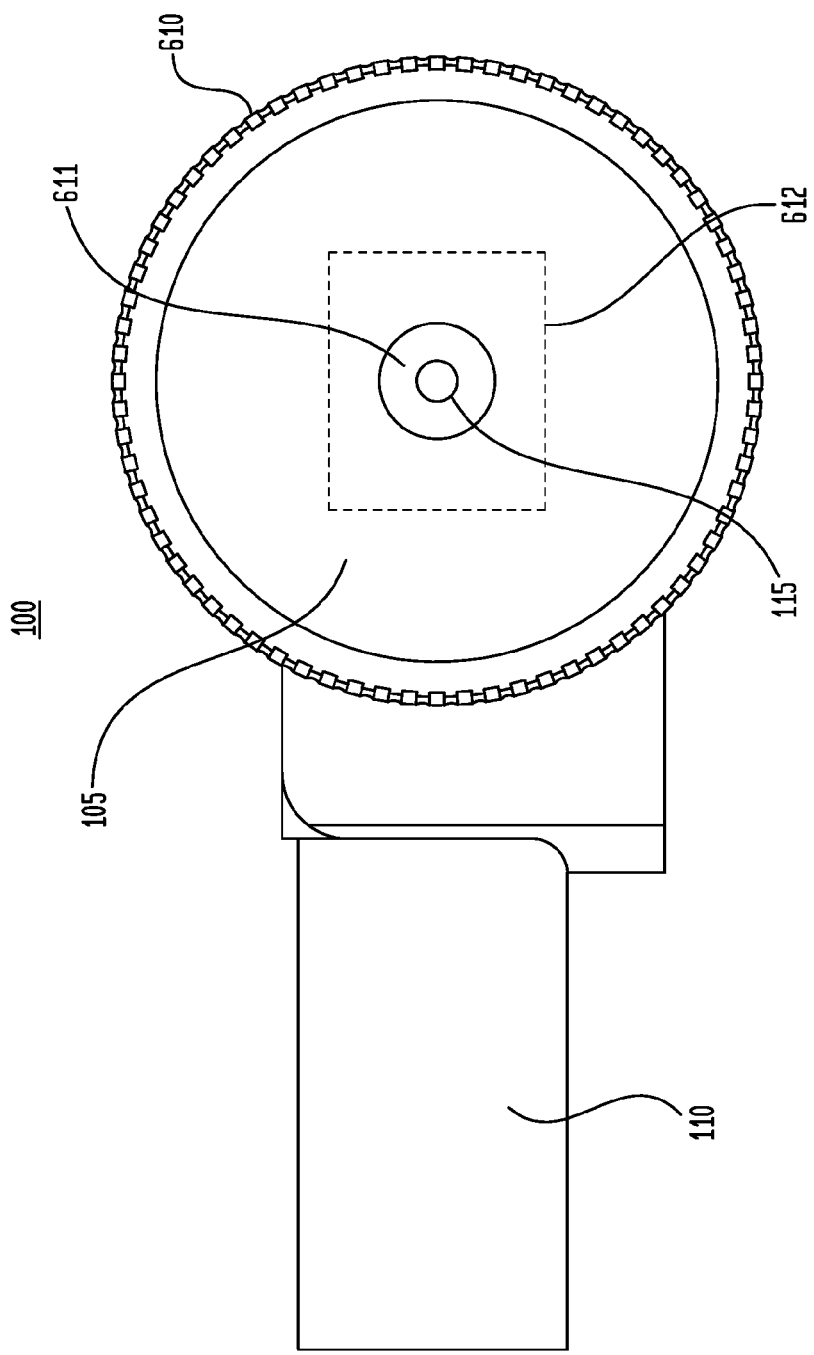

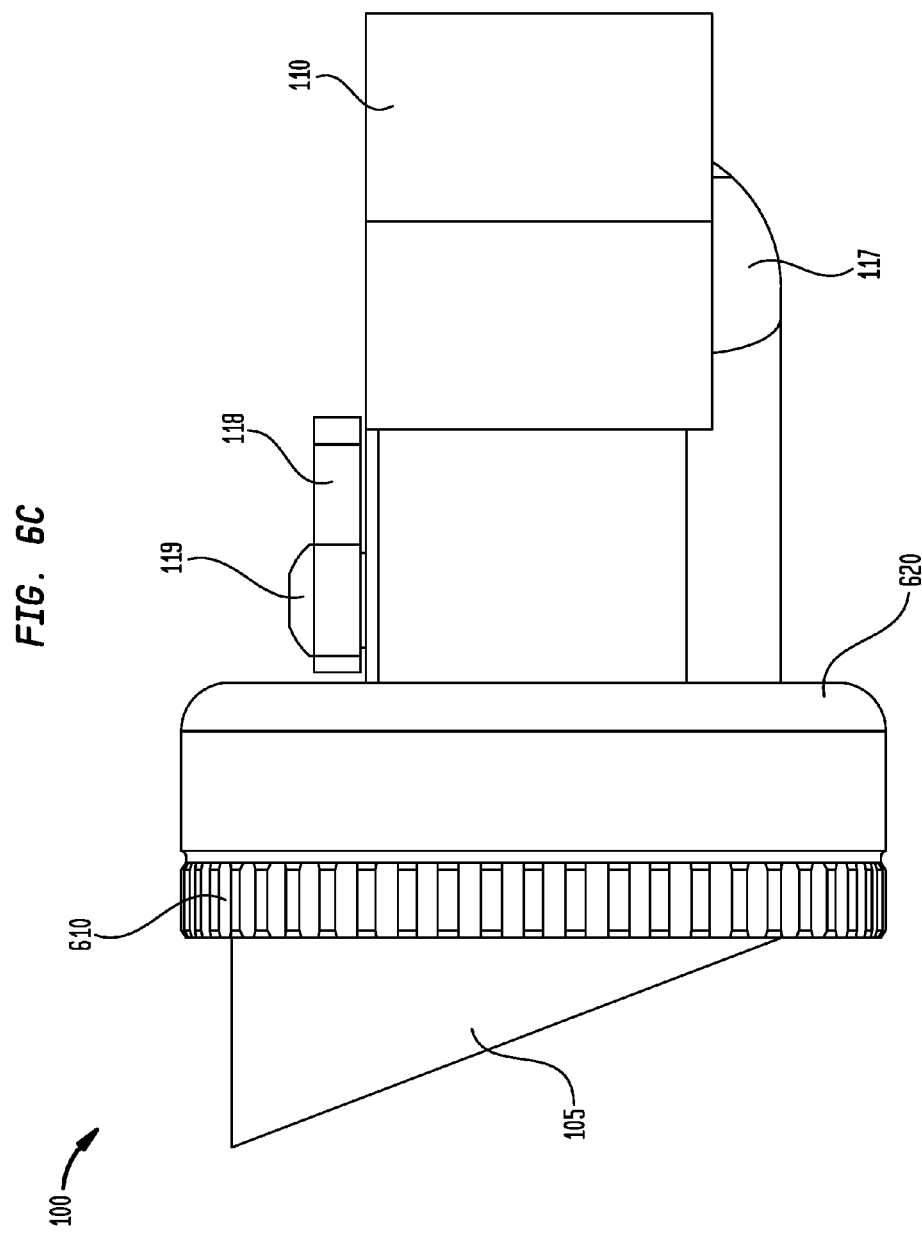

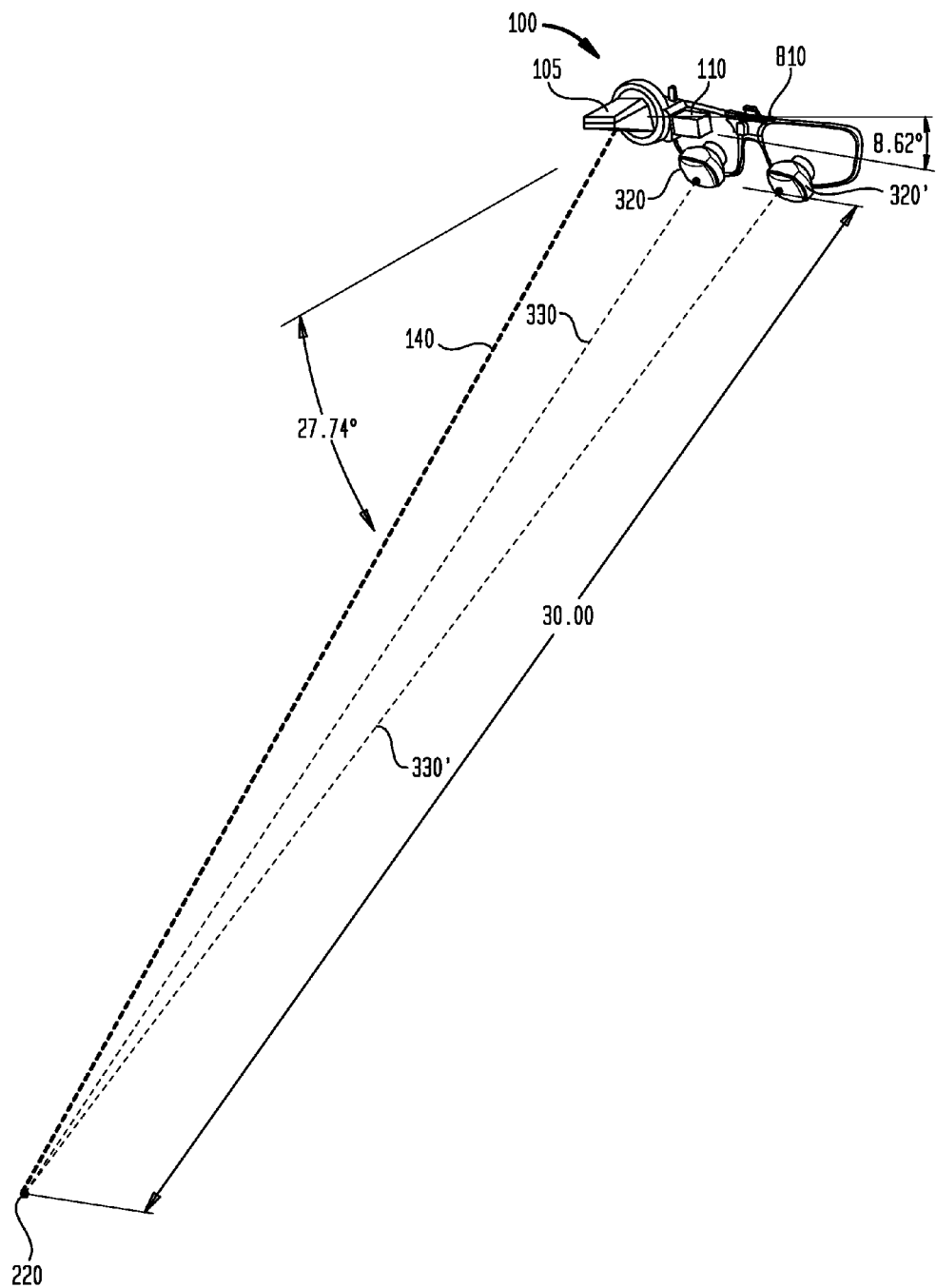

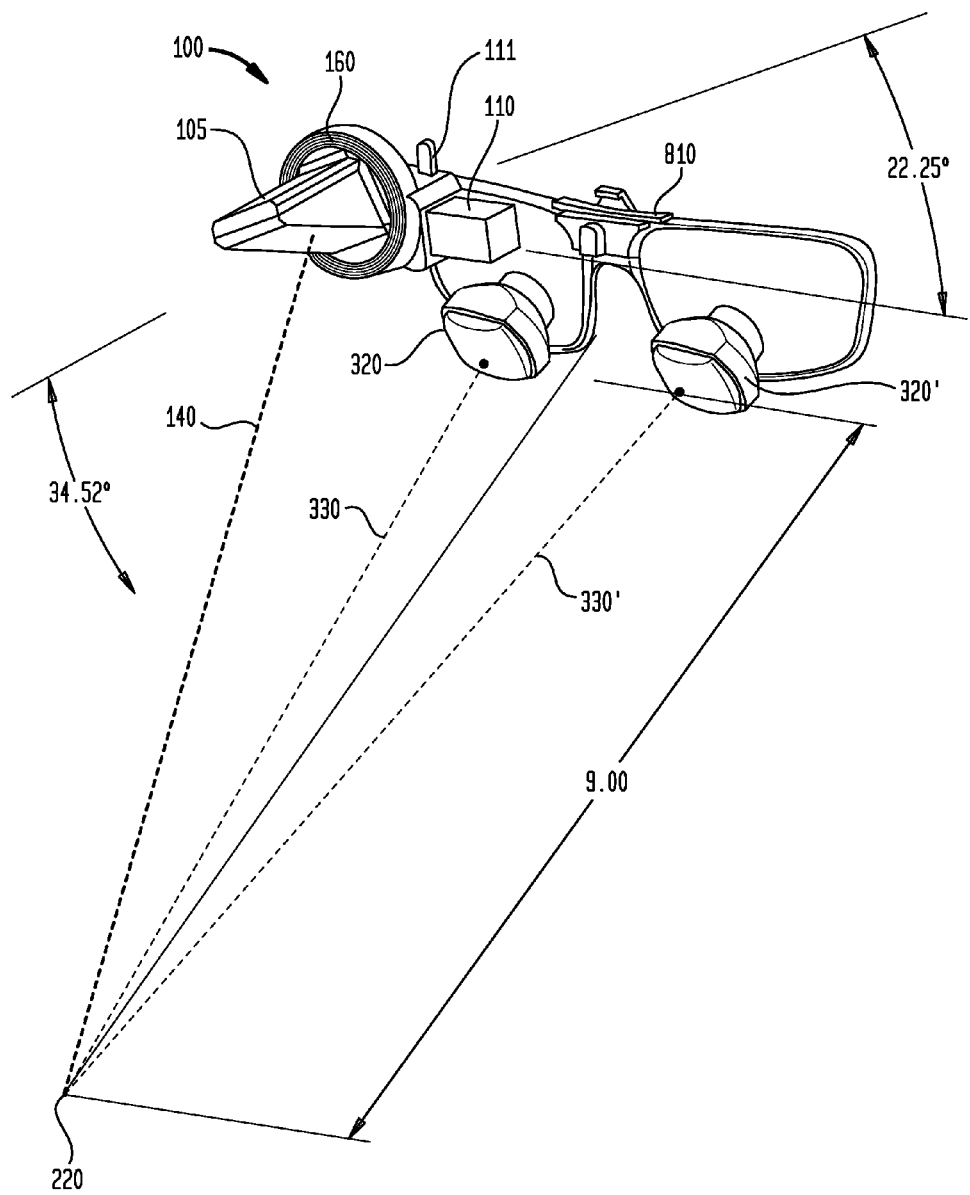

15 DEG PRISM DIOPTER

15 DEG PRISM DIOPTER

FIG. 10

| DRILL ANGLE (DEG) 25 DEG. | PRISM ANGLE (DEG) 15 DEG. PRISM DIOPTOR | |
|---|---|---|
| WORKING DISTANCE (IN) | ROTATION ANGLE FROM HORIZONTAL AXIS | DOWN ANGLE |
| 5 | 31.2 | 41.68 |
| 9 | 22.3 | 34.52 |
| 10 | 20.7 | 33.58 |
| 15 | 15.4 | 30.76 |
| 18 | 13.3 | 29.81 |
| 20 | 12.2 | 29.33 |
| 25 | 10.1 | 28.47 |
| 29 | 8.9 | 27.99 |
| 30 | 8.6 | 27.74 |

ADJUSTABLE OPTICAL AXIS CONTROL

CLAIM OF PRIORITY

This application claims, pursuant to 35 USC 120, as a Continuation, priority to and the benefit of the earlier filing date of, that patent application entitled "Adjustable Optical Axis Control, filed on Jan. 17, 2015 and afforded Ser. No. 14/599,487, which claimed pursuant to 35 USC 119, priority to, and the benefit of the earlier filing date of, that patent application entitled "Adjustable Optical Axis Control,"

filed on Jul. 24, 2014 and afforded Ser. No. 62/028,692, the contents of which are incorporated by reference, herein.

RELATED APPLICATION

This application is related to patent application entitled "System for Camera Viewing and Illumination Alignment," filed on Nov. 22, 2013 and afforded Ser. No. 14/087,322 (now U.S. Pat. No. 9,219,849) and co-pending patent application entitled "System for Camera Viewing and Illumination Alignment," filed on May 17, 2014 and afforded Ser. No. 14/280,576, the contents each of which is incorporated in their entirety, by reference herein.

FIELD OF THE INVENTION

The instant application relates to the field of optics and more particularly to alignment of a camera axis to a desired viewing axis.

BACKGROUND OF THE INVENTION

GLASS, Google's head mounted device, represents a type of wearable technology that incorporates a digital camera into a head mounted device, such as a pair of glasses, which allows a user to perform task in a hands-free format. GLASS is a registered Trademark of Google, Inc., 160 Amphitheatre Parkway, Mountain View, Calif. The Google GLASS also has an integrated wide angle camera, which allows the wearer to take both video and images of scenes that are within the optical field of the wide angle camera. Utilizing the features of head mounted display and integrated camera, Google GLASS allows the wearer to capture events in real-time.

Generally, the optical axis of the Google GLASS is oriented substantially perpendicular to the mounting of GLASS to the frame. Such a configuration inhibits the optical axis from being independently directed. However, if the wearer is looking in a direction other than substantially perpendicular to the frame, the camera will not record what the wearer is looking at. Rather the camera will record what is substantially perpendicular to the frame. For example, if the user is looking in a downward direction in a task oriented position, e.g., cooking, writing, maintenance work, etc., the camera may or may not record what the wearer is looking at. As a result, users may not be able to orient the optical axis of the camera to intersect a user's viewing axis at a desired distance from the user.

Hence, there is a need in the industry for a method and system for orienting the optical axis of a camera system (e.g., Google GLASS camera) to intersect a user's viewing axis at a desired distance from the user.

SUMMARY OF THE INVENTION

A device for orienting an optical axis of a wide angle camera with a user's viewing axis at a desired distance from the user is disclosed.

The device comprises an attachment housing rotatable connected to a second housing. The second housing incorporating a prism assembly aligned with the optical axis of a wide angle camera that provides for the refraction of the optical axis of the wide angle camera.

The second housing may have a fixing means to retain the second housing, and the orientation of the prism, to maintain the refracted optical axis of the wide angle camera.

A device for aligning the optical axis of a camera is disclosed. The optical alignment device comprises a bracket attaching the device to a frame, the frame incorporating a camera system therein, the camera system having an optical axis projecting substantially horizontally from the camera system, a housing comprising a first part fixed to a first side of the bracket; and a second part comprising a prism refracting the optical axis of the camera system based on a power of the prism and a rotation of the prism with respect to the optical axis and a hinge between the first part and the second part, the hinge rotating the second part with respect to the first part.

BRIEF DESCRIPTION OF THE FIGURES

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1C illustrates further details of the second orientation of an optical axis control device in accordance with the principles of the invention.

FIG. 3 illustrates a top view of an application of an exemplary device for controlling an orientation of an optical axis of a wide angle camera in accordance with the principles of the invention.

FIG. 4 illustrates a side view of a second application of an exemplary device for controlling an orientation of an optical axis of a wide angle camera in accordance with the principles of the invention.

FIG. 5 illustrates a top view of the second application of the exemplary device for controlling an orientation of an optical axis of a wide angle camera in accordance with the principles of the invention.

FIGS. 6A-6D illustrate perspective views of the optical axis orientation control device in accordance with the principles of the invention.

FIGS. 8A-8B illustrates perspective views of an optical device in accordance with the principles of the invention.

FIG. 10 illustrates a table of orientation settings of an optical device in accordance with the principles of the invention versus working distance.

It is to be understood that the figures and descriptions of the present invention described herein have been simplified to illustrate the elements that are relevant for a clear understanding of the present invention, while eliminating, for purposes of clarity many other elements. However, because these omitted elements are well-known in the art, and because they do not facilitate a better understanding of the present invention, a discussion of such element is not provided herein. The disclosure herein is directed to also variations and modifications known to those skilled in the art.

DETAILED DESCRIPTION

Figure 1A:
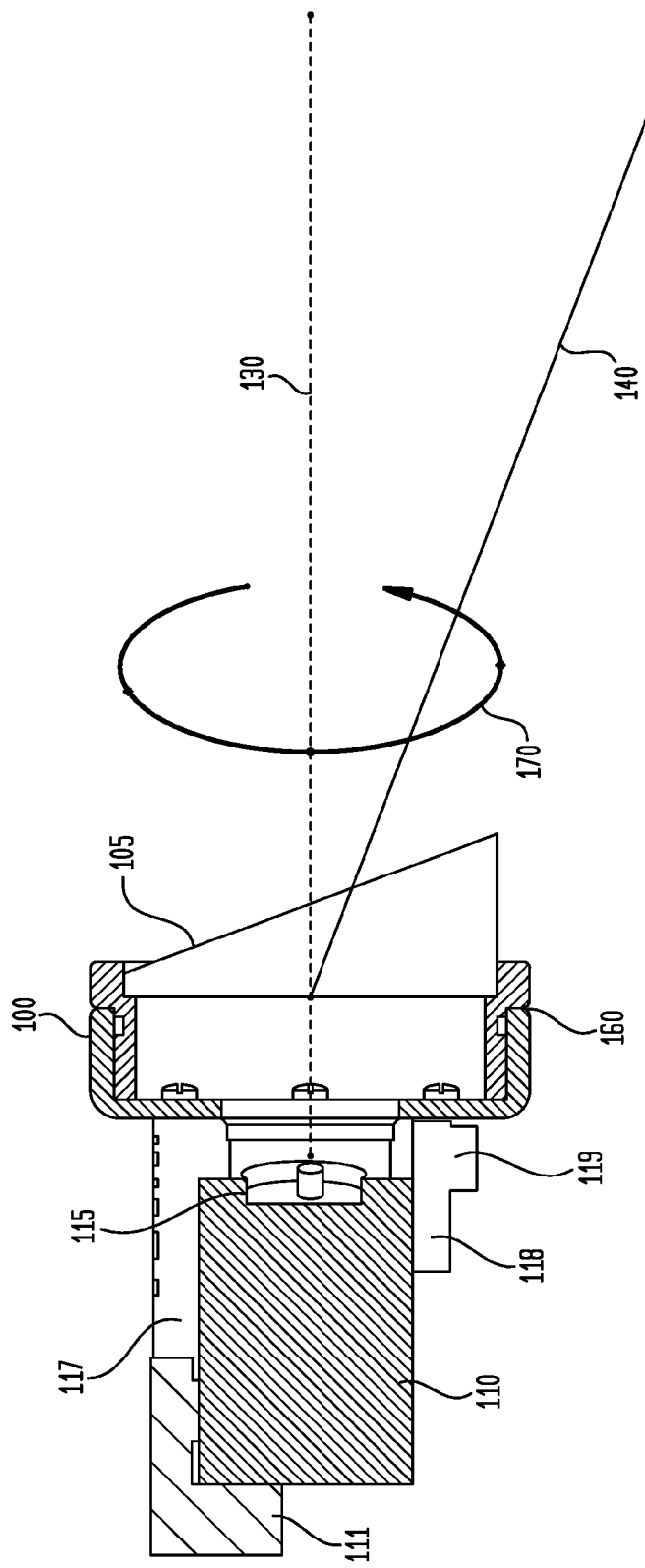
FIG. 1A illustrates an exemplary embodiment of a first orientation of an optical axis device control in accordance with the principles of the invention.

FIG. 1A illustrates an exemplary optical axis control device 100 in accordance with the principles of the invention. In this illustrated example, control device 100 is attached to a wide angle lens camera system 110. In one aspect of the invention, the wide angle lens camera system 110 may be the same or similar to that of the commonly referred to Google GLASS, that is currently available. In accordance with the principles of the invention, the focal point of camera system 110 is altered from the optical axis 130 shown to lie along the angle of refraction (e.g., 140, 140') of prism 105, as described in further detail herein.

Although the present invention is described with regard to the Google GLASS device, it would be appreciated that the present invention may be applicable to any head mounted wide angle camera system. Furthermore, it would be recognized that the wide angle camera system 110 may be incorporated into a headset that attaches to a user in a manner similar to that of eye-glasses and/or headbands, wherein the optical control device 100 may be incorporated into, or attached to, the eye-glasses and/or headband.

As illustrated, the optical axis 130 of the wide angle camera 115 in the wide angle camera system 110 (e.g., Google GLASS) is oriented substantially perpendicular to camera 115. As would be appreciated the optical axis 130 is contained in a plane that is substantially perpendicular in the plane of the paper on which the drawing is shown.

In accordance with the principles of the invention, an optical lens or prism 105 incorporated into control device 100 alters the orientation of the optical axis 130 of the wide angle camera 115 to lie along the downward (with respect to the plane containing optical axis 130) axis 140. Axis 140 in this altered or deflected state represents an effective optical axis of the camera 115.

Also illustrated is rotary joint 160, which allows prism 105 to be rotated, around the optical axis 130 of camera 115, to change the direction of axis 140 in a substantially circular direction 170. Rotary joint 160 is used to radial change the refracted axis of prism 105 about optical axis 130 such that the optical axis 130 of the wide angle camera 115 may be changed to one of a plurality of positions along a conical section as represented by axis 140.

Optical control device 100 further includes a frame 117 and a tab 118, which together attach optical control device 100 to camera system 110 (e.g. via a C-clamp-type bracket configuration). Screw 119, when tightened, retains pressure between tab 118 and frame 117 such that device 100 remains optically aligned with optical axis 130 of camera 115. Alternatively, frame 117 may include an extension tab 111, which attaches to a back end of camera system 110 or frame. In one aspect of the invention, tab 111 may be fixed such that device 100 may be snapped fitted onto camera system 110. In another aspect of the invention, tab 111 may be rotatable such that tab 111 may, in one state engage the back of camera system 110 and in another state be rotated away from the back of camera system 110. In a preferred embodiment, optical control device 100 is a removable device. Alternatively, optical control device 100 may be permanently mounted to camera system 110.

Figure 1B:
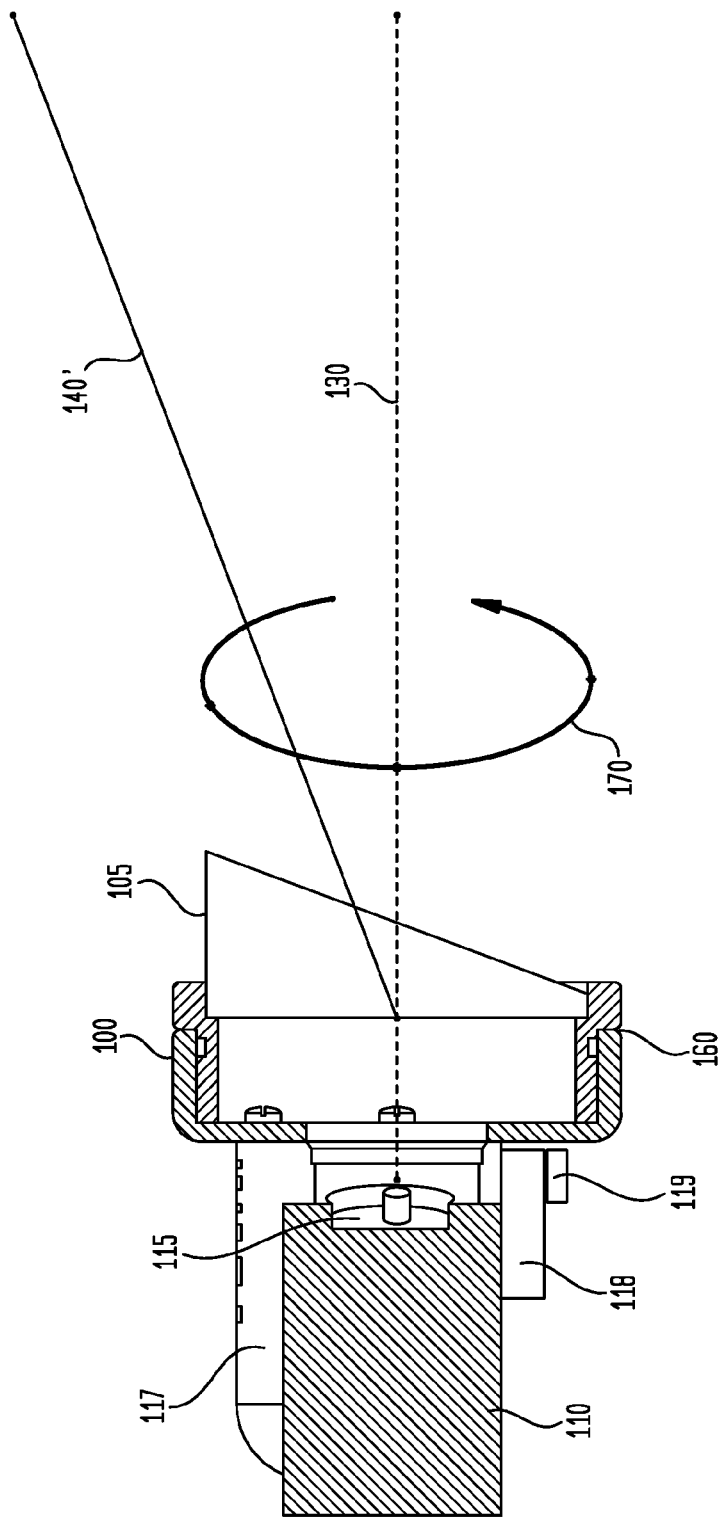
FIG. 1B illustrates an exemplary embodiment of a second orientation of an optical axis control device in accordance with the principles of the invention.

FIG. 1B illustrates a second aspect of the control device 100 shown in FIG. 1A, wherein the orientation of prism 105 is changed by the rotation of the orientation of prism 105 by rotary joint 160. In this illustrated aspect, the orientation of the optical axis 130 of the wide angle camera 115 is altered so as to lie along upward (with respect to the plane containing the optical axis 130) axis 140'.

In accordance with the principles of the invention, the effective optical axis 130 of camera 115 is directed along the edge of the conical shape as represented by axis 140 and axis 140'. By rotating prism 105 radially through 360 degrees (line 170) the refracted line of sight of the prism will sweep around a circle (line 170) forming a conical shape around the original line of sight (i.e., optical axis 130 of camera 115). For example, prism 105 may be rotated such that the effective optical axis 140 (140') may lie within the plane containing the optical axis 130. Similarly, the prism 105 may be rotated to achieve any angle between the axis 140 extending below the horizontal plane containing the optical axis 130 (FIG. 1A) and the axis 140' extending above the horizontal plane containing the optical axis 130 (FIG. 1B) along the conical shape formed by rotation of prism 105 along line 170.

FIG. 1C illustrates, similar to FIG. 1B, a second aspect of the embodiment of the invention. In this illustrated example, the field of view 192 of camera 115, which is centered on optical axis 130, is altered so that an altered field of view 194 of camera 115 is centered on effective optical axis 140'. As would be appreciated, the field of view of camera 115 is determined based on the characteristics of the camera 115 and corresponding lens system. Refraction of optical axis 130 by prism 105 along the conical shape, represented by axis 140 and axis 140', retains substantially the original camera field of view.

Figure 2:
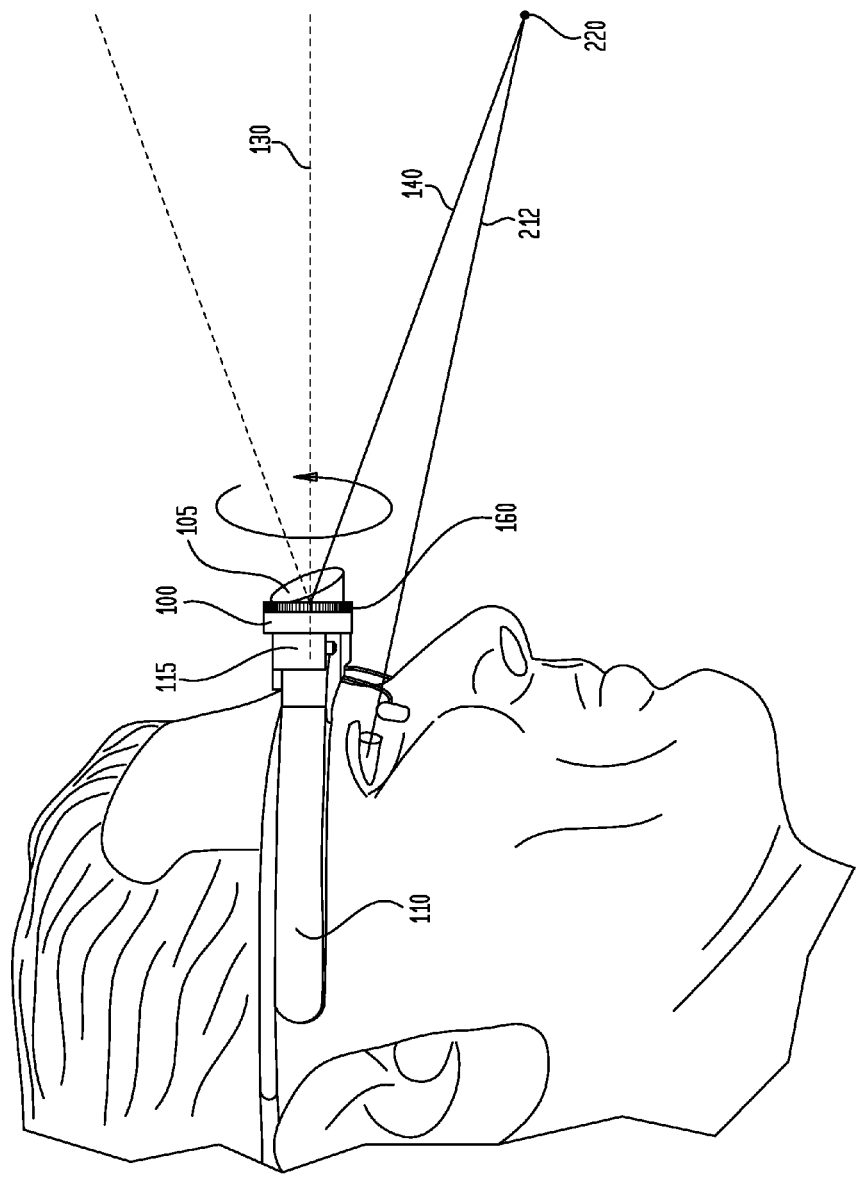
FIG. 2 illustrates a side view of an application of an exemplary device for controlling an orientation of an optical axis of a wide angle camera in accordance with the principles of the invention.

FIG. 2 illustrates a side view of an application of the optical axis control device 100 attached to a wide angle camera system 110, such as Google GLASS, wherein the optical axis 130 of the wide angle camera 115 (hidden by optical axis control device 100) is altered or refracted to lie along the downward (with respect to the horizontal plane containing the optical axis 130) axis 140. In addition, the angle to which the optical axis of camera 115 is altered is such that the axis 140 intersects a task oriented point 220. Task oriented point 220 represents a point (or area) of convergence of the altered optical axis 140 of camera 115 and an optical line of vision 212 of a user.

As would be recognized, and discussed in further detail, herein, the angle of refraction (i.e., alteration or deflection) of the optical axis 130 of camera 115 may be dependent upon the power of prism 105. For example, prisms having a high power cause greater alteration in the optical axis 130 that prisms having lower power.

In accordance with the principles of the invention, rotating prism 105 by joint 160, and deflecting (refracting) the optical axis 130 of camera 115 along effective optical axis 140 so as the viewing axis of camera 115 is directed to a point (e.g., task oriented point 220) at which the user is viewing, the field of view 192 of camera 115 is able to capture (either images or video) what the user is viewing (e.g., field of view 194) without the user adjusting his/her position to move camera 115 into a suitable position.

Although camera 115 is offset from the user's eyes, it would be recognized that, while the offset causes some degree of parallax, between the user's optical line of sight and the effective camera axis 140, the effect of parallax is diminished as the distance of task point 220 from camera 115 increases. Similarly, the effect of parallax between the effective optical axis of camera 140 and the user's line of sight may be diminished and compensated for using known methods.

FIG. 3 illustrates a top view of the application of the optical axis control device 100 shown in FIG. 2. In this illustrated example, optical control device 100 alters the orientation of prism 105 such that the effective optical axis 140 of camera 115 is directed toward task oriented point 220. Task point 220 is determined based on the user's eye position, which may be represented as the intersection of the viewing axis 330 of the user's right eye and the viewing axis 330' of the user's left eye. Thus, as the user's eyes change position the task point 220 changes and by appropriate orientation of prism 105, the effective optical axis 140 of camera 115 may coincide with the changed position of task point 220.

By maintaining the orientation of prism 105 such that the effective optical axis 140 of camera 115 is maintained at task point 220, camera 115 captures and/or records images at task oriented point 220 that are being viewed by the user.

Thus, in accordance with the principles of the invention, images of the tasks being performed by a user at the task point 220 may be captured and/or recorded without the user adjusting the camera's position in order to have the effective optical axis 140 of camera 115 to coincide with, or converge onto, task point 220.

As would be appreciated, the power and/or orientation of prism 105 may be designed for different distances of the task oriented point 220 from the user. For example, angle 215, which is measured between the refracted image axis 140 of prism 105 and the plane of surface 216 of prism 105, may be altered based on the power prism 105. In one aspect of the invention, by varying the angle 215 (thus, the angle of refracted image axis 140), the distance of task oriented point 220 from the user may be varied toward or away from the user. Thus, different prism powers may be used to accommodate different distances of task oriented point 220.

Alternatively, the orientation of prism 105 with respect to the optical axis 130 of camera 115 (see FIG. 1A) may be adjusted to allow, for a same power prism, task oriented points 220 to lie at different distances from the user, as will be further discussed.

FIG. 4 illustrates another exemplary application of the optical axis control device in accordance with the principles of the invention.

In this illustrative example, the wide angle camera 115 (not shown) incorporated into camera system (e.g., Google Glass) 110 that is incorporated into a surgical or dental headset 310. Surgical or dental head set 310 includes lens 315 into which telescopic lens 320 are incorporated. Typically, telescopic lens 320 may be oriented an any angle (downward) with respect to a horizontal plane (not shown), passing through the ends of telescopic lens 320, that is substantially parallel to the horizontal plane of optical axis 130. While telescopic lens 320 may be oriented at any known downward angle, for the purposes of describing the invention herein, a downward angle of 25 degrees is selected as a typical downward angle.

Furthermore, as FIG. 4 illustrates a side view of the surgical or dental headset 310, it would be appreciated that a second lens and telescopic lens 320 is not shown. The pair of telescopic lens 320 are also angularly oriented such that the line of sight of the telescopic lens 320 converge at task oriented point 220.

Telescopic lens 320 enables a surgeon or dentist to view an enlarged image of a desired area (e.g., task point 220). In many cases, a surgeon, for example, will operate where his working area is well below the level of his eyes and the surgeon will not necessarily tilt their head down in order to see the working area. In this situation, the surgeon may have a more horizontal head angle (e.g., in a plane parallel to the horizontal plane containing optical axis 130) and will depend on changing his eye position in order to look down a pair of angled telescopic lens 320, along viewing axis 330, to effectively view the area being operated on (e.g., task point 220). Since the surgeon's head is oriented generally horizontally, the wide angle camera 115 is not positioned to capture the operating area (task point 220) as the optical axis 130 is oriented substantially perpendicular to the headset 310 in the plane containing optical axis 130.

In accordance with the principles of the invention, the surgeon or dentist may orient prism 105 in optical control device 100 such that the optical axis 130 of camera 115 (not shown) is substantially coincident with effective optical axis 140 such that the field of view 194 of camera 115 is convergent upon the operating area (i.e., task oriented point 220). In this manner, a surgeon or dentist may record a task that the surgeon or dentist is performing even if the surgeon lifts his/her eye position during the operation or surgery. Furthermore, if the surgeon lifts his/her head and changes the effective optical axis 140 of camera 115, the correct orientation of the effective optical axis 140 may be reacquired when the surgeon returns their head/eyes to the task oriented point 220.

As discussed previously, a parallax effect between the effective optical axis 140 and viewing axis 330 is reduced as a distance to the task point 220 increases. Similarly, at closer ranges any parallax may be minimized by appropriate compensation. Alternatively, the effect of parallax may be minimal with the utilization of a camera 115 with a wide angle field of view.

FIG. 5 illustrates a top view of the application of the optical axis control device 100 shown in FIG. 4.

In this illustrated example, the task oriented point 220 is determined by the intersection of the viewing axis 330 of the right eye and the viewing axis 330' of the left eye through telescopic lens 320 and 320', respectively. Prism 105 is rotated by joint 160 (not shown), as previously discussed, such that the optical axis 130 of camera 115 (not shown) is coincident with axis 140, such that the effective optical axis of camera 115 is directed toward and substantially intersects task point 220. As previously discussed, in one aspect of the invention, at least one of the power and orientation of prism 105 determines the degree of refraction and, thus, the effective optical axis 140. In one aspect of the invention, a same task oriented point 220 may be achieved using different angles of rotation and powers of prism 105. Similarly, the distance of the task oriented point 220 from the user may be varied based on the use of different prisms with different powers and different angles of rotation.

Figure 6A:
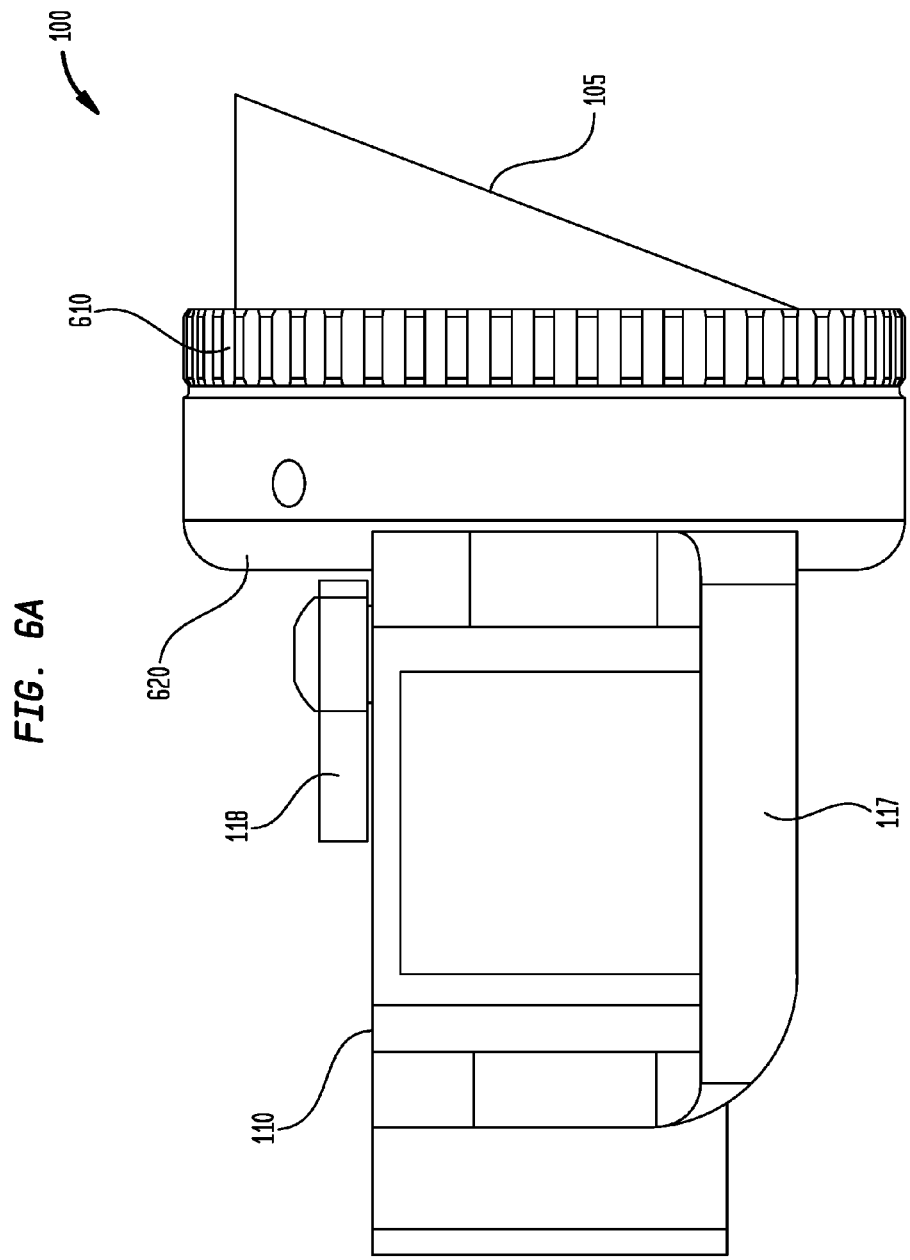

FIG. 6A illustrates a right side view of the optical axis control device 100, similar to that shown in FIG. 1A. Device 100 includes frame 117 used to attach device 100 to a head set including a camera 115 (e.g., Google Glass), as previously discussed. Frame 117 further includes a first housing 620 connected to second housing 610. Prism 105 is incorporated into second housing 610. Prism 105, as is generally known, is an optical clear glass or plastic lens that reflects light passing through it. As shown prism 105 may have a right angular configuration, wherein the base leg is attached to second housing 610 and the hypotenuse leg projects from second housing 610. The power of prism 105 is determined by the desired angle of the task orient point 220 in relation to the line of sight of the user and the position of the camera image axis.

Second housing 610 rotates with respect first housing 620 through joint 160 and changes the orientation of optical axis of camera 115 passing through prism 105 (see FIG. 1A). As previously discussed, frame 117 in conjunction with tab 118 (or tab 111) retains device 100 onto wide angle lens camera system 110. Camera 115, may itself be attached to, or incorporated within, a frame of an eyeglass or headband. Optical control device 100 is constructed such that the optical axis 130 of camera 115 is aligned, through an opening in the first housing, with prism 105.

FIG. 6B illustrates a front view of the optical axis control device 100, in accordance with the principles of the invention, showing camera system 110 and second housing 610, which includes prism 105. Further illustrated, through prism 105, is lens opening 611 in second housing 610. Lens opening 611 in second housing 610 coincides with a similar lens opening 612 in first housing 620. Lens openings 611 and 612 further coincides with, and are optically aligned to, the optical axis 130 (not shown) of camera 115.

FIG. 6C illustrates a left side view of the optical axis control device 100, which is similar to the right side view shown in FIG. 6A. In this exemplary embodiment, device 100 is shown attached to camera system 110 through a pressure asserted between tab 118 and frame 117 by screw 119.

As further shown an outer rim of second housing 610 may be knurled or serrated to provide a roughen surface to rotate second housing 610 with respect to first housing 620.

Figure 6D:
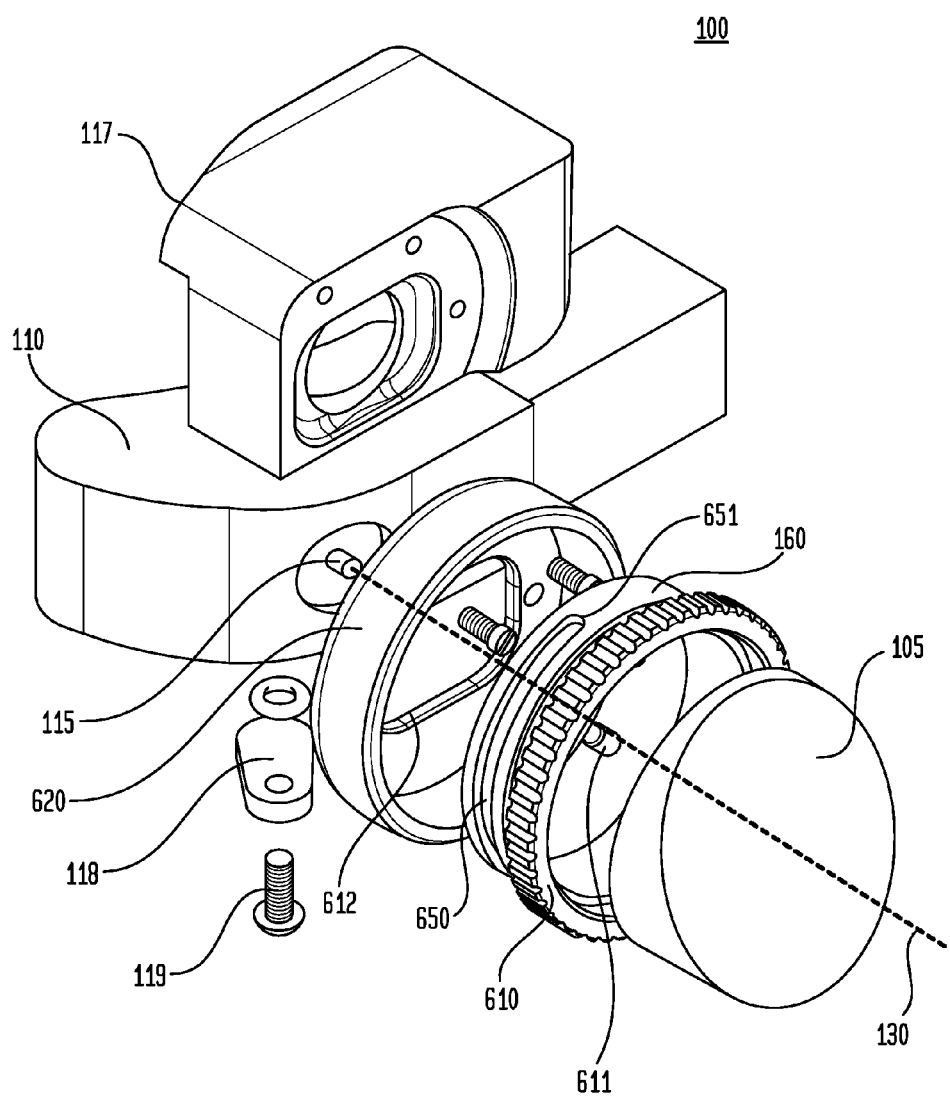

FIG. 6D illustrates an exploded perspective view of control device 100 showing frame 117, first housing 620 and second housings 610, which includes prism 105. Also shown is rotary joint 160 positioned on second housing 610 and engaging an interior surface of first housing 620. As shown a groove 650 may be included in first housing 610, which is used to guide rotation of second housing 610.

Groove 650 of rotary joint 160 may engage a tab or a raised track (not shown) in first housing 620, through which first housing rotates with respect to first housing 620. The engagement of groove 650 of rotary joint 160 with tab or a raised track (not shown) in first housing 620 enables second housing 610 to rotate about an axis substantially perpendicular to the first housing 620.

In accordance with the principles of the invention, second housing 610 may, thus, rotate substantially perpendicular to optical axis 130 of camera 115, as previously described.

Although it has been shown that the rotary joint 160 is positioned on second housing 610, it would also be appreciated that the rotary joint 160 may be positioned on first housing 620 without altering the scope of the invention. For example, first housing 620 may include an internal track or groove (not shown) and joint 160, located on second housing 610, may include a raised tab or raised track (not shown) that engages the not shown internal track or groove within first housing 620.

Further illustrated is screw 119 used in conjunction with tab 118 to retain device 100 in a fixed relationship with the optical axis 130 of camera 115 of wide angle lens camera system 110 (e.g., Google Glass).

Also illustrated is tab stop 651 in groove 650. Tab stop 651 limits the rotation of second housing 610 with respect to first housing 620. Utilizing tab stop 651, for example, limits the rotation of second housing 610 such that the refracted axis 140 of prism 105 may be limited to angles that point inward and toward task point 220 (not shown).

Although tab stop 651 allows for limited rotation of second housing 610, it would be recognized that groove 650 may be fabricated without tab stop 651 and thus, a full 360 degree rotation of second housing with respect to first housing 620 may be achieved. Similarly if two stops 651 are incorporated into groove 660, then rotation of second housing 610 with respect of first housing 620 is limited between the first and second tab stops 651.

Figure 7:
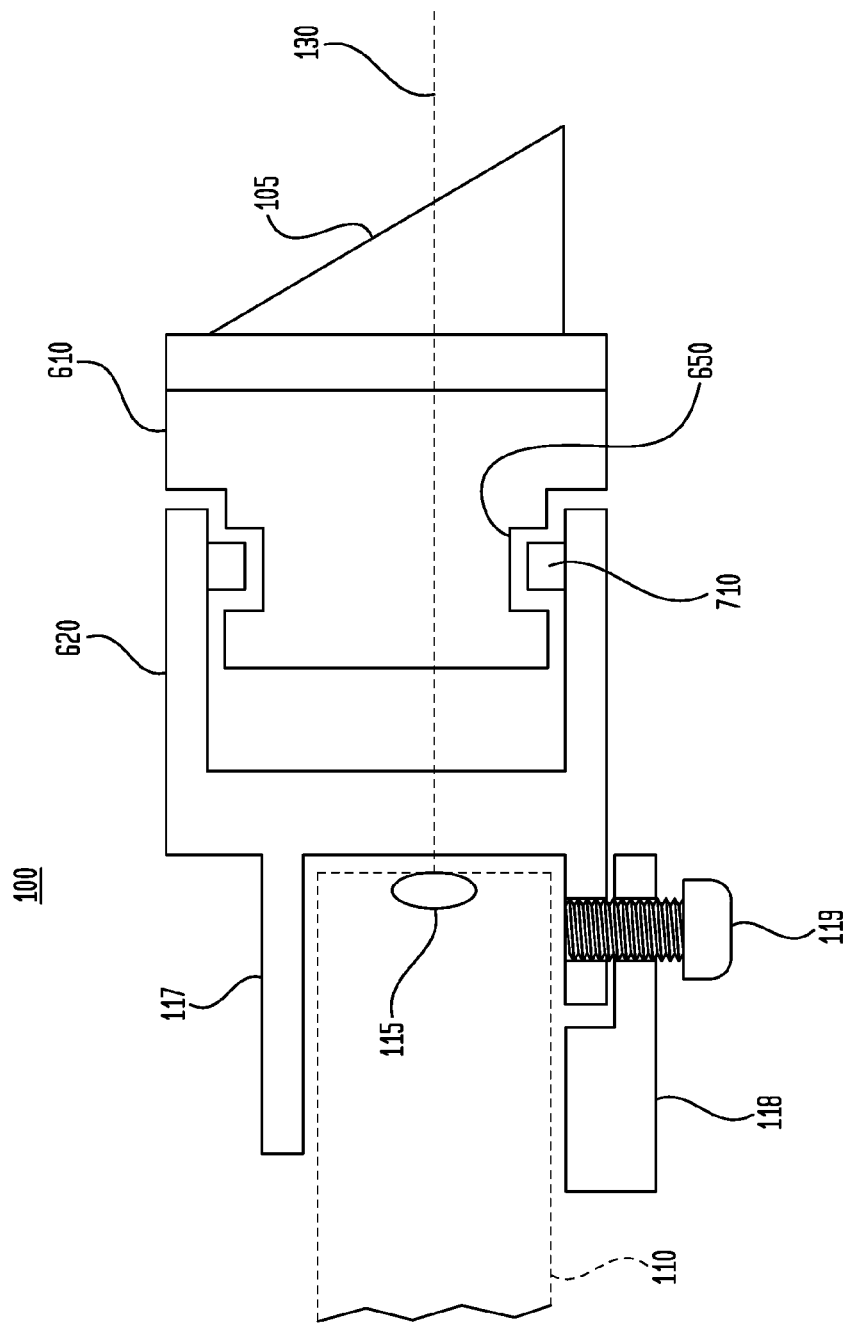
FIG. 7 illustrates a cross-section view of the optical axis orientation control device in accordance with the principles of the invention.

FIG. 7 illustrates a cross-sectional view of the optical axis control device 100 retained on wide angle camera system 110. In this illustrative example, optical control device 100 is retained on wide angle camera system 110 between frame 117 and tab 118 by engagement of screw 119 (as previously described). Further illustrated is first housing 620 and second housing 610, including prism 105. Within first housing 620 is a tab or raised track 710. Tab or raised track 710 engages groove 650 in second housing 610, such that second housing 610 may rotate with respect to first housing 620. Rotation of second housing 610 enables prism 105 to rotate with respect to optical axis 130 of camera 115, as previously discussed.

Although FIG. 7 illustrates an example of rotary joint 160 including tab or raised track 710 in first housing 620 and groove 650 in second housing 610, it would be appreciated that in an alternative embodiment, tab or raised track 710 may be formed in second housing 610 and groove 650 may be formed in first housing 620 without altering the scope of the invention claimed. Similarly the limiting tab 651 may be incorporated into groove 650, which in this alternative embodiment, is contained in first housing 620.

FIG. 8A illustrates a perspective view of an optical control device 100 and camera system 110 attached to an eyeglass assembly 810 including telescopic lens 320, 320', associated with the right and left eye, respectively. Also, shown is task point 220 at a distance of thirty (30) inches from the eyeglass assembly 810.

For purposes of describing the inventive concept of the present invention, in this illustrative embodiment, prism 105 is selected as a 15 degree diopter prism. As would be recognized in the art, a diopter represents a measure of the deflection of light passing through a prism equal to a deflection of 1 centimeter at a distance of 1 meter. It would be recognized that prisms of other powers (i.e., diopter) may be selected without altering the scope of the invention.

As shown, with a 15 degree diopter prism, in order to focus the effective optical axis 140 at or substantially near task point 220, with an orientation of telescopic lens 320 at a 25 degree down angle (from the horizontal plane parallel to the horizontal plane containing the optical axis 130), prism 105 is rotated at an angle of 8.62 degree above the horizontal plane containing the optical axis 130 so as to orient the optical axis 130 of camera 115 at a down angle of 27.7 degrees. Positioning prism 105 at the illustrated down angle orients the optical axis 130 of camera 115 along the effective optical axis 140 so as to focus the field of view of camera 115 on task point 220 (formed by the intersection of the viewing lines 330, 330'). FIG. 8B illustrates a perspective view of the orientation of optical device 100 similar to that shown in FIG. 8A, wherein the task point 220 is selected to be nine (9) inches from the eyeglass 810. In this case, the 15 degree diopter prism 105 is oriented at a down angle of 34.52 degrees by rotating prism 105 by 22.5 degrees from the horizontal plane containing the optical axis 130 in order to orient the optical axis 130 of camera 115 along effective optical axis 140.

Figure 9A:
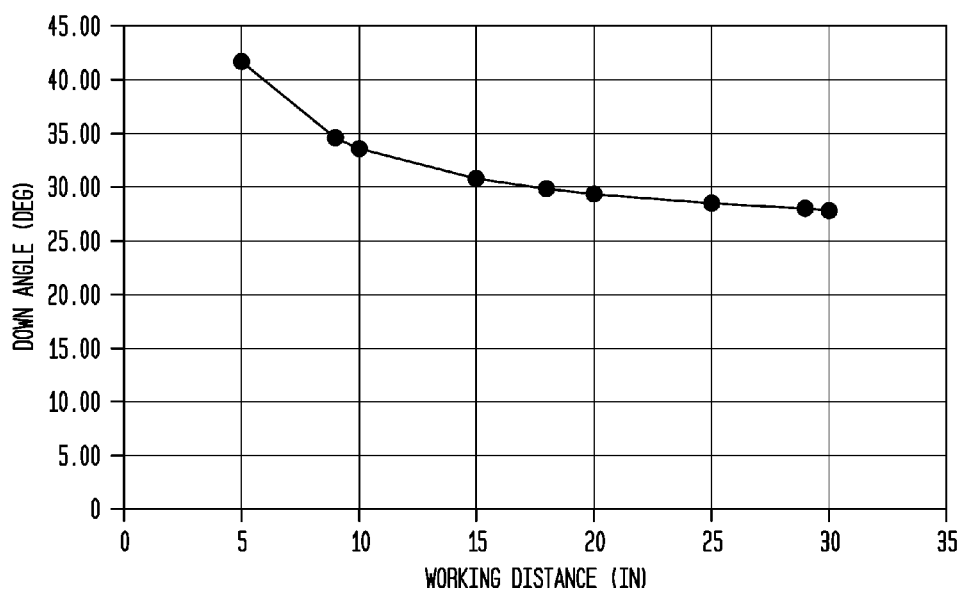
FIGS. 9A-9B illustrate graphs of an orientation of an optical device in accordance with the principles of the invention versus working distance.
Figure 9B:
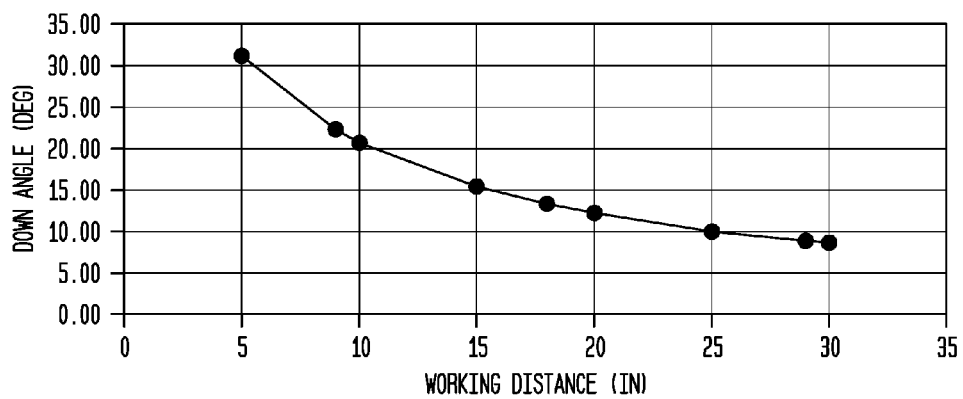

FIGS. 9A and 9B illustrate graphs of down angle and rotational angle, respectively, as a function of distance, with a 15 degree Diopter prism. FIG. 9A illustrates, for the configuration shown in FIGS. 8A and 8B, the down angle required (i.e., the effective optical axis 140) to focus camera 115 onto task point 220 varies between 42 and 28 degrees. FIG. 9B illustrates that the rotational angle (from the horizontal plane containing the optical axis 130) to achieve the required distance varies between 30 and 9 degrees.

Although FIGS. 9A and 9B illustrate the operational conditions for a particular configuration (i.e., 15 degree diopter prism and telescopic lens at 25 degrees downward angle) it would be appreciated, that either one or both of the prism power and telescopic lens orientation (or no telescopic lens at all) may be altered without altering the scope of the invention. For example, the prism power may be selected to be in a range of 5-25 degree diopter. A specific power may be determined based on the downward angle of the telescopic lens. Similarly, the prism power and the downward angle of the telescopic lens may be determined based on a desired task point distance. Such different configurations have been contemplated and are considered to be within the scope of the invention.

FIG. 10 illustrates a chart of the combination of working distance (task point 220) and the rotational angle of prism 105 to achieve a down angle necessary to deflect the optical axis 130 of camera 115 along effective optical axis 140. FIG. 10 illustrates rotational angles for the optical control device 100 when incorporated into an assembly having downward orientation (i.e., drill angle) of 25 degrees and a prism power of 15 degree Diopter. It would be within the knowledge of those skilled in the art to formulate combinations of working distance and rotational angles using different prism power to achieve different down angles. The use of different downward orientations and/or prism powers is considered to be within the scope of the invention claimed herein.

Returning to FIGS. 1A and 1B, FIGS. 1A and 1B illustrate a conventional configuration of a flat face of prism 105 being substantially perpendicular to the optical axis 130 of camera 115 (hidden by optical axis control device 100), it would be appreciated that the flat face of prism 105 may be oriented offset from a perpendicular position such that the angle of refraction caused by prism 105 may be different than when prism 105 is oriented as shown in FIGS. 1A and 1B.

Thus, the orientation of prism within second housing 610 as being parallel to or offset from second housing 610 is also considered to be within the scope of invention.

Although not shown it would be appreciated that a locking mechanism may be utilized to lock or retain the rotational angle of prism 105 at a desired angle. For example, a screw (not shown) may be screwed through the first and second housings to in order to retain the positional relationship between the first and second housings.

The invention has been described with reference to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention.

Benefits, other advantages, and solutions to problems have been described above with regard to specific embodiments. The benefits, advantages, and solutions to problems, and any element(s) that may cause any benefits, advantages, or solutions to occur or become more pronounced, are not to be construed as a critical, required, or an essential feature or element of any or all of the claims.

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "of" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description herein should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In any instances, the terms "about" may include numbers that are rounded (or lowered) to the nearest significant figure.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A surgical eyewear system comprising:
   a plurality of lens, each lens incorporating a telescopic lens therein, said telescopic lens oriented to focus at a desired task oriented point;
   a camera system positioned on the eyewear system, said camera system having an optical axis positioned off the desired task oriented point; and
   an alignment system, attached to the camera system, said alignment system altering the camera system optical axis to substantially converge at the desired task oriented point, the alignment system comprising:
   a housing comprising:
      an attachment means configure to attach the alignment system to the camera system on a first side of the housing;
      a prism positioned on a second side of the housing; said housing including an opening therein, aligned to the optical axis of the camera system; and
      a rotatory joint between said attachment means and said prism, said rotatory joint changing the orientation of the prism to substantially converge the camera system optical axis to substantially converge at the desired task oriented point.

2. The surgical eyewear system of claim 1, wherein said first part and said second part include openings therein, said openings aligned with said optical axis.

3. The surgical eyewear system of claim 1, wherein said attachment means comprises:
- an upper part configured to be positioned on an upper part of the camera system; and
- a lower part configured to be positioned on a lower part of the camera system, wherein said camera system is captured between the upper part and the lower part.

4. The surgical eyewear system of claim 3, further comprising:
- a screw hole in at least one of said upper part and said lower part, wherein a screw in said screw hole engages a corresponding one of said upper part and said lower part.

5. The surgical eyewear system of claim 3, wherein said upper part further comprising:
- a tab engaging a back end of said camera system, said tab rotatable with respect to said back end of said frame.

6. The surgical eyewear system of claim 1, wherein said rotatory joint comprises:
- a raised track; and
- a groove engaging said raised track.

7. The surgical eyewear system of claim 6, further comprising:
- at least one tab within said groove.

8. The surgical eyewear system of claim 1, further comprising:
- means for retaining said prism in a fixed position.

9. The surgical eyewear system of claim 1, wherein said prism has a power in a range of 5-25 degree diopters.

\* \* \* \* \*